(12) United States Patent
Mounzer

(10) Patent No.: US 12,466,253 B2
(45) Date of Patent: Nov. 11, 2025

(54) ELECTRICAL MOTOR ARRANGEMENT

(71) Applicant: Volvo Car Corporation, Gothenburg (SE)

(72) Inventor: Raid Mounzer, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/620,510

(22) Filed: Mar. 28, 2024

(65) Prior Publication Data

US 2024/0326584 A1  Oct. 3, 2024

(30) Foreign Application Priority Data

Mar. 31, 2023  (EP) ..................................... 23165984

(51) Int. Cl.
*H02K 16/00* (2006.01)
*B60K 1/00* (2006.01)
*B60K 17/08* (2006.01)

(52) U.S. Cl.
CPC ................ *B60K 17/08* (2013.01); *B60K 1/00* (2013.01)

(58) Field of Classification Search
CPC .. H02K 16/005; B60K 6/26; B60K 2006/264; B60K 2006/266
See application file for complete search history.

(56) References Cited

U.S. PATENT DOCUMENTS

| | | | | |
|---|---|---|---|---|
| 7,591,748 B2* | 9/2009 | Holmes | .................. | B60K 6/445 903/910 |
| 8,253,294 B1* | 8/2012 | Wishart | .............. | H02K 16/005 310/239 |
| 9,130,435 B2* | 9/2015 | Stenvall | ................... | H02K 9/06 |

(Continued)

FOREIGN PATENT DOCUMENTS

| | | | | |
|---|---|---|---|---|
| DE | | 20303611 U1 * | 7/2004 | .......... H02K 16/005 |
| DE | 102011084092 A | | 4/2013 | |

(Continued)

OTHER PUBLICATIONS

Search report issued for EP Application No. 23165984.8, mailed on Oct. 2, 2023, 7 pages.

*Primary Examiner* — Paul N Dickson
*Assistant Examiner* — Maxwell L Meshaka
(74) *Attorney, Agent, or Firm* — Raj S. Dave; Dave Law Group LLC

(57) ABSTRACT

According to an embodiment, it is an electrical motor arrangement comprising a first rotation element for providing a first rotational movement, and a second rotation element for providing a second rotational movement, and wherein in a first configuration the first rotation element is configured as a stator and the second rotation element is configured as a rotor, and wherein in a second configuration the first rotation element is configured as the rotor and the second rotation element is configured as the stator of the electrical motor arrangement, wherein the electrical motor arrangement is configured to operate alternately in the first (Continued)

configuration and the second configuration; wherein at least one of the first rotational movement and the second rotational movement is provided to a transmission arrangement, and wherein the electrical motor arrangement is configured for providing a rotational movement for a transmission of a vehicle.

20 Claims, 2 Drawing Sheets

(56) References Cited

U.S. PATENT DOCUMENTS

| | | | | |
|---|---|---|---|---|
| 2012/0286610 A1* | 11/2012 | Wishart | ............... | H02K 23/60 |
| | | | | 310/115 |
| 2013/0175893 A1* | 7/2013 | Stenvall | ............... | H02K 16/005 |
| | | | | 310/83 |
| 2023/0311634 A1* | 10/2023 | Chae | ............... | H02K 1/20 |
| 2024/0326584 A1* | 10/2024 | Mounzer | ............... | B60K 1/00 |

FOREIGN PATENT DOCUMENTS

| | | | | | |
|---|---|---|---|---|---|
| DE | 102011084092 A1 | * | 4/2013 | ............... | B60K 6/26 |
| DE | 102013213323 A1 | * | 1/2015 | ............... | B60L 7/28 |
| DE | 102017110581 A1 | * | 11/2018 | ............... | B60K 6/365 |
| GB | 2466967 A | * | 7/2010 | ............... | B60K 17/165 |
| GB | 2483673 A | * | 3/2012 | ............... | B60K 6/26 |

* cited by examiner

ELECTRICAL MOTOR ARRANGEMENT

CROSS-REFERENCE TO RELATED APPLICATIONS

This application claims the benefit of European Patent Application Number 23165984.8, filed on Mar. 31, 2023, which is hereby incorporated by reference in its entirety.

TECHNICAL FIELD

The present disclosure relates to an electrical motor arrangement for providing rotational movement for a transmission of a vehicle, a method for providing rotational movement for a transmission of a vehicle, a vehicle with an electrical motor arrangement and/or a use of a planetary gearbox in an electrical motor arrangement.

BACKGROUND ART

Known electrical motor arrangements comprise a stationary stator and a moveable rotor, whereby the motor arrangement generates a torque by an interaction of the stator and the rotor. This torque is transmitted to a driven axle of a vehicle via a gearbox or transmission, whereby continuous and smooth torque transmission is an issue, in particular when the transmission changes gears.

In view of this, it is found that a further need exists to provide an electrical motor arrangement for providing rotational movement for a transmission of a vehicle.

SUMMARY

In the view of the above, it is an object of the present disclosure to provide an electrical motor arrangement for providing rotational movement for a transmission of a vehicle.

The problem is at least partially solved or alleviated by the subject matter of the independent claims of the present disclosure, whereby further examples are incorporated in the dependent claims.

According to a first aspect, an electrical motor arrangement for providing rotational movement for a transmission of a vehicle, comprising: a first rotational means for providing a first rotational movement of the electrical motor arrangement; and a second rotational means for providing a second rotational movement of the electrical motor arrangement; whereby in a first configuration, the first rotational means is configured as a stator of the electrical motor arrangement and the second rotational means is configured as a rotor of the electrical motor arrangement and whereby in a second configuration, the first rotational means is configured as a rotor of the electrical motor arrangement and the second rotational means is configured as a stator of the electrical motor arrangement; whereby the first rotational movement and/or the second rotational movement is provided to a transmission arrangement.

The electrical motor arrangement may be configured as a three-phase motor, linear motor, AC (alternating current) motor, transverse flux machine, DC (direct current) motor, universal motor, repulsion motor, ball bearing motor, unipolar machine, and/or disc motor, in particular axial flux motor.

The transmission of the vehicle may also be configured as the transmission arrangement. The rotational movement may for example be a rotational movement in order to transmit a torque or rotational force to the transmission.

The first rotational means and/or the second rotational means may be configured as rotational/rotatably elements of the electrical motor arrangement for providing the rotational movement for the transmission. Furthermore, the first rotational means may comprise a first torque transmission path for providing the first rotational movement. Further, the second rotational means may comprise a second torque transmission path for providing the second rotational movement. Moreover, the first torque transmission path and/or the second torque transmission path may be used as a torque chain for the respective rotational means.

In the first configuration, the second rotational means may be at least configured to provide the second rotational movement for the transmission unit. In the second configuration, the first rotational means may be at least configured to provide the first rotational movement for the transmission unit.

Therefore, the electrical motor arrangement may be configured to provide a torque for the transmission, whereby the torque may be provided in the first configuration by the second rotational means and whereby the torque may be provided in the second configuration by the first rotational means.

In an implementation, the first rotational means may be arranged as an outer rotational means of the electrical motor arrangement and the second rotational means may be arranged as an inner rotational means of the electrical motor arrangement; or the first rotational means may be configured as a first rotation element of the electrical motor arrangement and the second rotational means may be configured as a second rotation element of the electrical motor arrangement.

For example, if the first rotating means may be configured as the outer rotating means and the second rotating means may be configured as the inner rotating means, the electrical motor arrangement may be configured as an electric motor with radial rotating elements.

Further, if the first rotational means may be configured as a first rotation element and the second rotational means may be configured as the second rotation element, the electrical motor arrangement may be configured as an electrical motor with axial rotating elements.

In an implementation, the electrical motor arrangement may further comprise: a first brake unit may be configured to brake the first rotational means; and a second brake unit may be configured to brake the second rotational means.

The first brake unit and/or the second brake unit may be configured in order to counteract the rotational movement of the first rotational means and/or the second rotational means at least in parts.

In an implementation, a movement of the first rotational means or the second rotational means may be partially and/or completely braked, in order that the braked rotation means may be used as the stator of the electrical motor arrangement.

In other words, in order to affect the resulting transmission ratio between the motor and the driven axis, each of the rotating parts may be fully or partially braked.

In other implementations, the partial and/or full braking may be performed, for example, in order to facilitate a gear shifting.

In an implementation, the transmission arrangement may be a planetary gearbox.

In other words, the planetary gear may be planetary gear train, which may be configured as a gear train or friction gear, and therefore may comprise fixed shafts as well as axles, each of which rotates on circular paths in a frame.

Accordingly, a distinction may be made between the central or sun gears mounted on the fixed axles of the frame and the planetary gears mounted on the rotating axles. Further, the wheels that rotate on the rotating axes may orbit a central wheel, similar to how planets orbit the sun. In turn, the rod supporting the rotating axles may rotate in order around an axle attached to the frame.

In an implementation, the first rotational means may be connected to a sun wheel of the planetary gearbox and the second rotational means may be connected to planets of the planetary gearbox.

In further implementation, an output of the planetary gearbox may be connected to a ring gear of the planetary gearbox.

Further, the first rotational means may be connected to the sun wheel, the second rotational means may be connected to the ring gear and an output of the planetary gearbox may be connected to the planets.

Further, the first rotational means may be connected to the ring gear, the second rotational means may be connected to the planets and an output of the planetary gearbox may be connected to the sun wheel.

In an implementation, the first rotational means and/or the second rotational means may be connected to at least one gear means at least configured to decouple the first rotational means and the sun wheel and/or the second rotational means and the planets.

Furthermore, the at least one gear means may be configured to decouple the first rotational means and the respective transmission arrangement of the first rotational means and/or the second rotational means and the respective transmission arrangement of the second rotational means.

In other embodiments, the first rotational means and/or the second rotational means may be connected to at least one gear means at least configured to provide different ratios between the first rotational means and the sun wheel and/or the second rotational means and the planets.

The at least one gear means may be configured with multiple gears in order to modify, for example, speed, direction of rotation, and/or torque of the first rotational movement and/or the second rotational movement.

In an implementation, a ring gear of the planetary gearbox may be connected to an output shaft.

The output shaft may be configured to provide the rotational movement of the electrical motor arrangement for the vehicle.

In an implementation, the electrical motor arrangement may be configured to operate alternately between the first configuration and the second configuration.

For example, at a first time the electrical motor arrangement may be operated in the first configuration and at a second time the electrical motor arrangement may be operated in the second configuration, whereby after the second time the motor arrangement may be operated in the first configuration again, for example.

Thereby, the first time may correspond to a use of a vehicle that is before and/or after activation of a gear change, and the second time may correspond to a use of the vehicle that is during activation of the gear change.

Furthermore, the first time and/or the second time may comprise a different duration, whereby the duration of the respective times may for example depend on the respective use of the vehicle.

In an implementation, in a third configuration, the first rotational means may be configured as a rotor of the electrical motor arrangement and the second rotational means may be configured as rotor of the electrical motor arrangement.

For example, the third configuration may be configured so that both rotors may be used as main rotors, in particular in a two-speed transmission. In this case, the third configuration may be activated during a gear change whereby one rotor is brought to a standstill and the other rotor, which was previously static, is brought to rotation. In this case, the second rotor may not only rotate during the gear change, but it may also start to rotate during the gear change and after the gear change. In this respect, the gear change may take place between the torque paths and may be independent of whether a gear other than the main planetary gear is mounted on the torque paths.

In other words, the third configuration may be used if the first rotational means and the second rotational means may be configured as rotors of the electrical motor arrangement.

Therefore, the first rotational means or the second rotational means may be configured as a main rotor of the electrical motor arrangement for providing a rotational movement to the transmission unit and the second rotational means or the first rotational means may be configured as a secondary rotor of the electrical motor arrangement. In addition, the secondary rotor may be configured to rotate and transfer torque for a limited time through a secondary rotor torque path while a gear shift may occur on the main rotor torque path.

Moreover, once a gear change may be activated, the secondary rotor, for example the first rotational means or the second rotational means, may be gradually rotated until the main rotor stops, for example the second rotational means or the first rotational means, or rotates at a speed that facilitates the gear change in a main torque path. Once the gear change has occurred in the main torque path, the main rotor, for example the second rotational means or the first rotational means, may be gradually unlocked and the secondary rotor, for example the first rotational means or the second rotational means, may be gradually decelerated by the first brake unit and/or the second brake unit to a stop.

The use of the first configuration, in which the first rotational means may be configured as a stator of the electrical motor arrangement and the second rotational means may be configured as a rotor of the electrical motor arrangement, and the second configuration, in which the first rotational means may be configured as a rotor of the electrical motor arrangement and the second rotational means may be configured as stator of the electrical motor arrangement, may in particular be used for a transmission of a rotational movement before and/or after a change of gear of a transmission.

Furthermore, the use of the second configuration, in which the first rotational means is configured as a rotor of the electrical motor arrangement and the second rotational means is configured as rotor of the electrical motor arrangement, may in particular used for a change of gear of a transmission.

Moreover, in particular a change between the first configuration and the second configuration to the third configuration may preferably be used for example, in order to avoid additional efficiency losses or shortened product life that may be associated with allowing the secondary rotor to rotate (e.g., additional losses due to brushes).

Further, for example, the vehicle may be operated primarily with the main rotor torque chain whereby the secondary rotor may be stationary until a gear change is required. Once the gear shift is activated the secondary rotor may, for example, gradually rotate until the main rotor is stationary or rotating at a speed that facilitates the gear shift on the main torque path. For example, once gear shifting occurs on the main torque path, the main rotor may be gradually unlocked, and the secondary rotor gradually decelerated to a stop.

In an implementation, the electrical motor arrangement may be configured to be housed in at least a driven axle of the vehicle.

In an embodiment, the vehicle may be driven primarily with the main rotor torque chain engaged and the secondary rotor stationary until a gear change is required. Once the gear change is activated, the secondary rotor may gradually rotate until the main rotor is stationary or rotating at a speed that facilitates the gear shift in the main torque path. Once the gear change has occurred in the main torque path, the main rotor may be gradually unlocked, and the secondary rotor gradually decelerated to a stop.

Thereby, for example, applying brakes on the inner rotor and forcing it to be at standstill while allowing the outer rotor only to rotate may result in a total gear ratio of a rotation of the electrical motor arrangement of $R_{outer}$. Moreover, applying brakes on the outer rotor and forcing it to be at standstill while allowing the inner rotor only to rotate may result in a total gear ratio of a rotation of the electrical motor arrangement of $R_{inner}$.

Furthermore, an example of the application may be a two-speed gearbox where $R_{outer}$ and $R_{inner}$ represent the speed of two gears. By locking the inner rotor, torque may be transmitted with $R_{outer}$, while by locking the outer rotor, torque may be transmitted with $R_{inner}$. When shifting between $R_{outer}$ and $R_{inner}$, for example, the brakes on the inner rotor may be released gradually, and the brakes may be engaged on the outer rotor until it reaches standstill. During the transitional period, the gear ratio may be gradually changed between the two limit ratios $R_{outer}$ and $R_{inner}$. This may ensure that during shifting, the torque may never be interrupted on the wheels, and the transmission occurs smoothly.

A further aspect of the present disclosure relates to a method for providing rotational movement for a transmission of a vehicle, comprising: providing an electrical motor arrangement according to any one of the preceding claims; controlling the electrical motor arrangement at least in a first configuration or in a second configuration; whereby in the first configuration, a first force receiving element of the transmission arrangement is driven and a second force receiving element of the transmission arrangement is braked and whereby in the second configuration, the second force receiving element is driven and the first force receiving element is braked; and providing a first rotational movement and/or a second rotational movement to a transmission arrangement.

In an implementation, the controlling of the electrical motor arrangement may further comprise controlling the electrical motor arrangement in a third configuration, whereby in the third configuration, the planets and the sun wheel are driven.

According to an embodiment, it is an electrical motor arrangement comprising a first rotation element configured for providing a first rotational movement of the electrical motor arrangement; and a second rotation element configured for providing a second rotational movement of the electrical motor arrangement; and wherein in a first configuration, the first rotation element is configured as a stator of the electrical motor arrangement and the second rotation element is configured as a rotor of the electrical motor arrangement; and wherein in a second configuration, the first rotation element is configured as the rotor of the electrical motor arrangement and the second rotation element is configured as the stator of the electrical motor arrangement; whereby at least one of the first rotational movement and the second rotational movement is provided to a transmission arrangement; and wherein the electrical motor arrangement is configured to operate alternately in the first configuration and the second configuration; and wherein the electrical motor arrangement is configured for providing a rotational movement for a transmission of a vehicle.

According to an embodiment, it is a method comprising providing an electrical motor arrangement, wherein the electrical motor arrangement comprising, a first rotation element configured for providing a first rotational movement of the electrical motor arrangement; and a second rotation element configured for providing a second rotational movement of the electrical motor arrangement; and wherein in a first configuration, the first rotation element is configured as a stator of the electrical motor arrangement and the second rotation element is configured as a rotor of the electrical motor arrangement; and wherein in a second configuration, the first rotation element is configured as the rotor of the electrical motor arrangement and the second rotation element is configured as the stator of the electrical motor arrangement; whereby at least one of the first rotational movement and the second rotational movement is provided to a transmission arrangement; and wherein the electrical motor arrangement is configured to operate alternately in the first configuration and the second configuration; controlling the electrical motor arrangement wherein in the first configuration, a first force receiving element of the transmission arrangement is driven and a second force receiving element of the transmission arrangement is braked and whereby in the second configuration, the second force receiving element is driven and the first force receiving element is braked; and providing at least one of a first rotational movement and a second rotational movement to the transmission arrangement; and wherein the method is configured for providing rotational movement for a transmission of a vehicle.

According to an embodiment, it is a vehicle comprising an electrical motor arrangement, wherein the electrical motor arrangement comprising a first rotation element configured for providing a first rotational movement of the electrical motor arrangement; and a second rotation element configured for providing a second rotational movement of the electrical motor arrangement; and wherein in a first configuration, the first rotation element is configured as a stator of the electrical motor arrangement and the second rotation element is configured as a rotor of the electrical motor arrangement; and wherein in a second configuration, the first rotation element is configured as the rotor of the electrical motor arrangement and the second rotation element is configured as the stator of the electrical motor arrangement; whereby at least one of the first rotational movement and the second rotational movement is provided to a transmission arrangement; and wherein the electrical motor arrangement is configured to operate alternately in the first configuration and the second configuration; and wherein the electrical motor arrangement is configured for providing a rotational movement for a transmission of the vehicle.

A further aspect of the present disclosure relates to a vehicle with the disclosed electrical motor arrangement, whereby the electrical motor arrangement is housed in an electrical motor arrangement housing of the vehicle.

A further aspect of the present disclosure relates to a use of a planetary gearbox in the disclosed electrical motor arrangement and/or in the disclosed vehicle.

BRIEF DESCRIPTION OF DRAWINGS

In the following, the disclosure is described exemplarily with reference to the enclosed figures, in which.

Notably, the figures are merely schematic representations and serve only to illustrate examples of the present disclosure. Identical or equivalent elements are in principle provided with the same reference signs.

DETAILED DESCRIPTION

Figure 1:
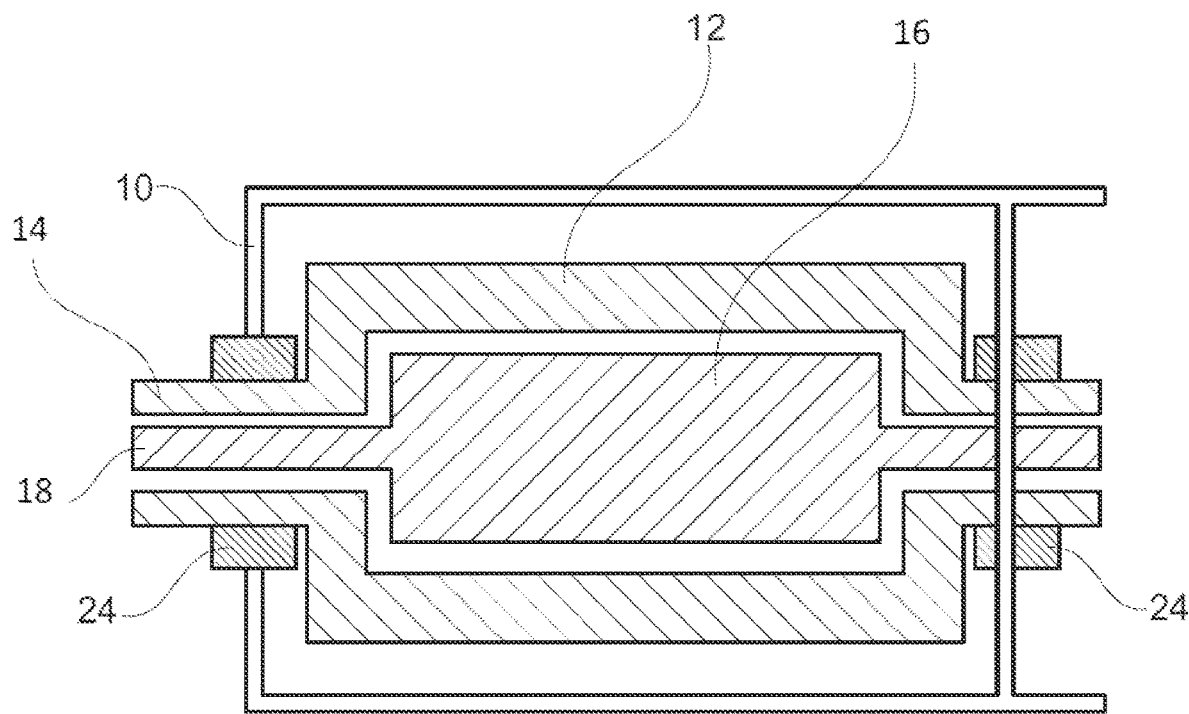
FIG. 1 is a schematic illustration showing an overview of an implementation of the disclosed electrical motor arrangement.

FIG. 1 shows a schematic illustration showing an overview of an implementation of the disclosed electrical motor arrangement for providing rotational movement for a transmission of a vehicle, comprising: a first rotational means 12 for providing a first rotational movement of the electrical motor arrangement 10; and a second rotational means 16 for providing a second rotational movement of the electrical motor arrangement 10; whereby in a first configuration, the first rotational means 12 is configured as a stator of the electrical motor arrangement 10 and the second rotational means 16 is configured as rotor of the electrical motor arrangement 10 and whereby in a second configuration, the first rotational means 12 is configured as a rotor of the electrical motor arrangement 10 and the second rotational means 16 is configured as stator of the electrical motor arrangement 10; whereby the first rotational movement and/or the second rotational movement is provided to a transmission arrangement 30.

Further, the first rotational means 12 is arranged as an outer rotational means of the electrical motor arrangement 10 and the second rotational means 16 is arranged as an inner rotational means of the electrical motor arrangement 10.

Further, the first rotational means 12 provides the first rotational movement by a first torque transmission path 14 and the second rotational means 16 provides the second rotational movement by a second torque transmission path 18.

In addition, the electrical motor arrangement comprises bearings 24 in order to mount the first rotational means 12, the first torque transmission path 14, the second rotational means 16 and/or the second torque transmission path 18.

Figure 2:
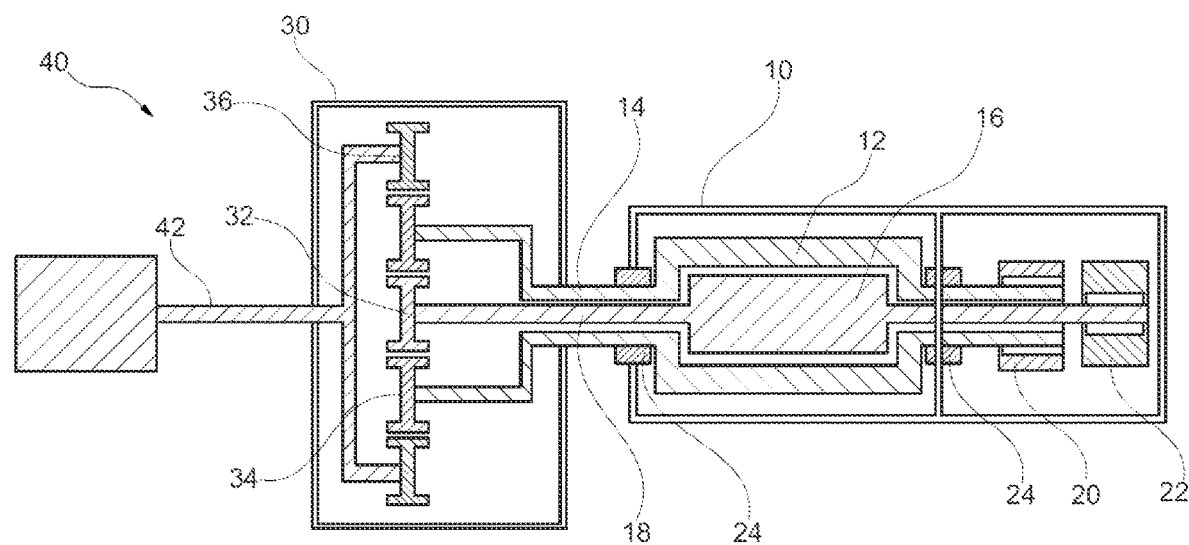
FIG. 2 is a schematic illustration showing a first implementation of the disclosed electrical motor arrangement.

FIG. 2 shows a schematic illustration showing a first implementation of the disclosed electrical motor arrangement according to FIG. 1, whereby the electrical motor arrangement 10 is further comprising: a first brake unit 20 configured to brake the first rotational means 12; and a second brake unit 22 configured to brake the second rotational means 16.

Furthermore, a movement of the first rotational means 12 or the second rotational means 16 is partially and/or completely braked, in order that the braked rotation means 12, 16 are used as the stator of the electrical motor arrangement 10.

Further, the electrical motor arrangement 10 provide the rotational movement to a transmission arrangement 30 which is configured as a planetary gearbox 30. Therefore, in this example, the first rotational means 12 are rotational connected with the first torque transmission path 14 to planets 34 of the planetary gearbox 30 and the second rotational means 16 are rotational connected with the second torque transmission path 18 to the sun wheel 32 of the planetary gearbox 30.

Further, a ring gear 36 of the planetary gearbox is connected to an output shaft 42 to provide a rotational movement of the planetary gearbox 30.

Moreover, the electrical motor arrangement 10 is configured to operate alternately between the first configuration and the second configuration.

In addition, the electrical motor arrangement 10 is configured to be housed in at least a driven axle of the vehicle 40.

Figure 3:
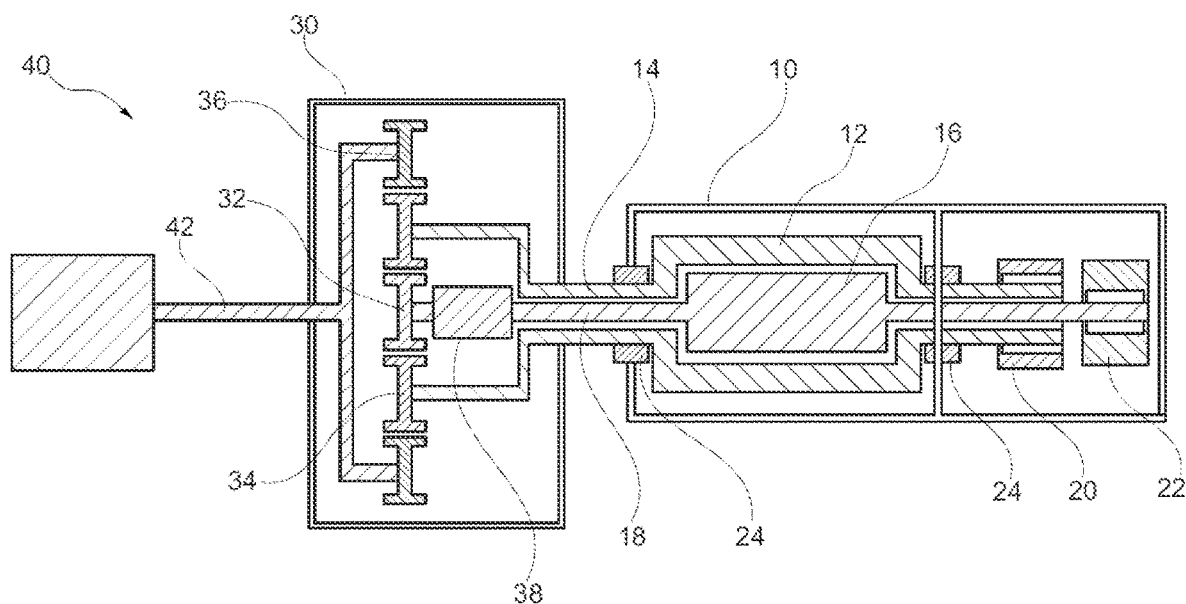
FIG. 3 is a schematic illustration showing a second implementation of the disclosed electrical motor arrangement.

FIG. 3 shows a schematic illustration showing a second implementation of the disclosed electrical motor arrangement according to FIG. 1 and FIG. 2, whereby, in tis example, the second rotational means 16 are connected to at least one gear means 38 at least configured to decouple the second rotational means 16 and the sun wheel 32.

Figure 4:
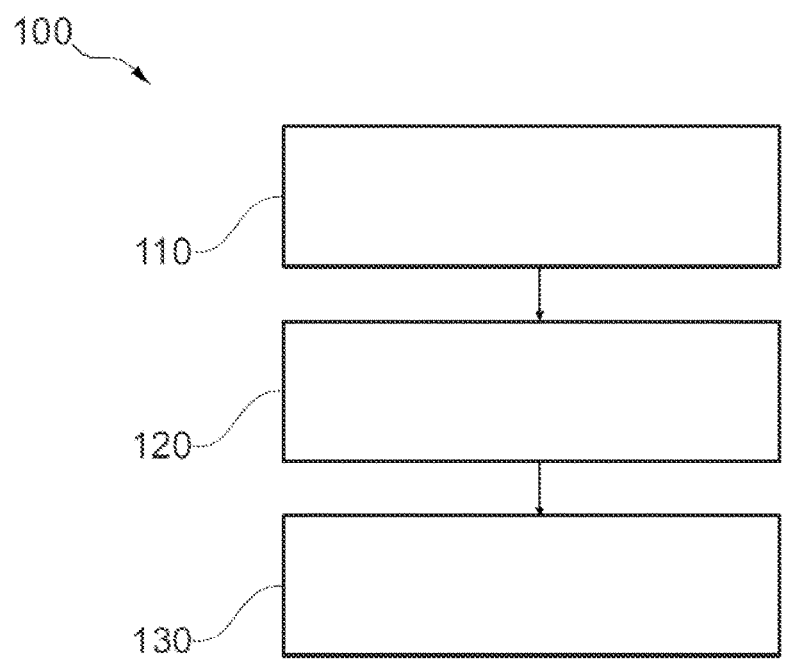
FIG. 4 is an example of a diagram of the disclosed method.

FIG. 4 shows an example of a diagram of the disclosed method 100 for providing rotational movement for a transmission of a vehicle, comprising: providing 110 an electrical motor arrangement according to any one of the preceding claims; controlling 120 the electrical motor arrangement at least in a first configuration or in a second configuration; whereby in the first configuration, a first force receiving element of the transmission arrangement is driven and a second force receiving element of the transmission arrangement is braked and whereby in the second configuration, the second force receiving element is driven and the first force receiving element is braked; and providing 130 a first rotational movement and/or a second rotational movement to a transmission arrangement.

Other variations to the disclosed examples may be understood and effected by those skilled in the art in practicing the claimed subject matter, from the study of the figures, the disclosure, and the appended claims. In particular, respective parts/functions of the respective example described above may also be combined with each other. In particular, the present disclosure is not limited to specific modules, vehicle functions, user interfaces, user interface areas/fields and/or communication methods. In the claims, the word "comprising" does not exclude other elements or steps and the indefinite article "a" or "an" does not exclude a plurality. The mere fact that certain measures are recited in mutually different dependent claims does not indicate that a combination of these measures may not be used to advantage. Any reference signs in the claims should not be construed as limiting the scope of the claims.

As used herein, the terms "first," "second," "third," and the like in the description and in the claims, if any, distinguish between similar elements and do not necessarily describe a particular sequence or chronological order. The terms are interchangeable under appropriate circumstances such that the embodiments herein are, for example, capable of operation in sequences other than those illustrated or otherwise described herein. Furthermore, the terms "include," "have," and any variations thereof, cover a non-exclusive inclusion such elements but method, system, article, device, or apparatus that comprises a list of elements is not necessarily limiting to those elements, but may include other elements not expressly listed or inherent to such process, method, system, article, device, or apparatus.

While this specification contains many specifics, these do not construe as limitations on the scope of the disclosure or of the claims, but as descriptions of features specific to particular implementations. A single implementation may implement certain features described in this specification in the context of separate implementations. Conversely, multiple implementations separately or in any suitable sub-combination may implement various features described herein in the context of a single implementation. Moreover, although features described herein as acting in certain combinations and even initially claimed as such, one or more features from a claimed combination may in some cases be excised from the combination, and the claimed combination may be directed to a sub-combination or variation of a sub-combination.

Even though particular combinations of features are recited in the claims and/or disclosed in the specification, these combinations are not intended to limit the disclosure of possible implementations. Other implementations are within the scope of the claims. For example, the actions recited in the claims may be performed in a different order and still achieve desirable results. In fact, many of these features may be combined in ways not specifically recited in the claims and/or disclosed in the specification. Although each dependent claim may directly depend on only one claim, the disclosure of possible implementations includes each dependent claim in combination with every other claim in the claim set.

LIST OF REFERENCE SIGNS 10 electrical motor arrangement
12 first rotational means
14 first torque transmission path
16 second rotational means
18 second torque transmission path
20 first brake unit
22 second brake unit
24 bearings
30 transmission arrangement (planetary gearbox)
32 sun wheel
34 planets
36 ring gear
38 gear means
40 vehicle
42 output shaft
100 Method for providing rotational movement
110 providing an electrical motor arrangement
120 controlling the electrical motor arrangement
130 providing a first rotational movement and/or a second rotational movement

What is claimed is:

1. An electrical motor arrangement comprising:
a first rotation element configured for providing a first rotational movement of the electrical motor arrangement;
a second rotation element configured for providing a second rotational movement of the electrical motor arrangement;
a first brake unit configured to brake the first rotation element; and
a second brake unit configured to brake the second rotation element; and wherein in a first configuration, the first rotation element is configured as a stator of the electrical motor arrangement and the second rotation element is configured as a rotor of the electrical motor arrangement; and
wherein in a second configuration, the first rotation element is configured as the rotor of the electrical motor arrangement and the second rotation element is configured as the stator of the electrical motor arrangement;
whereby at least one of the first rotational movement and the second rotational movement is provided to a transmission arrangement; and
wherein the electrical motor arrangement is configured to operate in one of the first configuration and the second configuration by selectively braking one of the first rotation element and the second rotation element; and
wherein the electrical motor arrangement is configured for providing a rotational movement for a transmission of a vehicle.

2. The electrical motor arrangement of claim 1, wherein the first rotation element is arranged as an outer rotational element of the electrical motor arrangement and the second rotation element is arranged as an inner rotational element of the electrical motor arrangement.

3. The electrical motor arrangement of claim 1, wherein the electrical motor arrangement is configured to provide a torque for the transmission, and wherein the torque is provided in the first configuration by the second rotation element and wherein the torque is provided in the second configuration by the first rotation element.

4. The electrical motor arrangement of claim 1, wherein the electrical motor arrangement is configured to operate alternately in one of the first configuration and the second configuration.

5. The electrical motor arrangement of claim 4, wherein the stator of the electrical motor arrangement is at least partially braked.

6. The electrical motor arrangement of claim 1, wherein the transmission arrangement is a planetary gearbox.

7. The electrical motor arrangement of claim 6, wherein the first rotation element is connected to a sun wheel of the planetary gearbox and the second rotation element is connected to planets of the planetary gearbox.

8. The electrical motor arrangement of claim 7, wherein at least one of the first rotation element and the second rotation element is connected to at least one gear means, wherein the gear means is at least configured to decouple at least one of the first rotation element and the sun wheel and the second rotation element and the planets.

9. The electrical motor arrangement of claim 8, wherein a ring gear of the planetary gearbox is connected to an output shaft, and wherein the output shaft is configured to provide a rotational movement of the electrical motor arrangement for the vehicle.

10. The electrical motor arrangement of claim 1, wherein in a third configuration, the first rotation element is configured as a first rotor of the electrical motor arrangement and the second rotation element is configured as a second rotor of the electrical motor arrangement.

11. The electrical motor arrangement of claim 10, wherein the third configuration is configured for a use in at least one of a change of gear of the transmission and a two-speed transmission.

12. The electrical motor arrangement of claim 10, wherein the first rotation element comprises a first torque transmission path for providing the first rotational movement and the second rotation element comprises a second torque transmission path for providing the second rotational movement; and wherein the second rotor is configured to rotate and transfer a torque for a limited time through a secondary rotor via the second torque transmission path while a gear shift occurs on the first torque transmission path.

13. The electrical motor arrangement of claim 1, wherein the electrical motor arrangement is configured to be housed in at least a driven axle of the vehicle.

14. The electrical motor arrangement of claim 1, wherein the first configuration is used at least one of before and after activation of a gear change of the vehicle, and wherein the second configuration is used during activation of the gear change of the vehicle.

15. A method comprising:
providing an electrical motor arrangement,
wherein the electrical motor arrangement comprising,
   a first rotation element configured for providing a first rotational movement of the electrical motor arrangement; a second rotation element configured for providing a second rotational movement of the electrical motor arrangement; a first brake unit configured to brake the first rotation element; and a second brake unit configured to brake the second rotation element; and
   wherein in a first configuration, the first rotation element is configured as a stator of the electrical motor arrangement and the second rotation element is configured as a rotor of the electrical motor arrangement; and
   wherein in a second configuration, the first rotation element is configured as the rotor of the electrical motor arrangement and the second rotation element is configured as the stator of the electrical motor arrangement;
   whereby at least one of the first rotational movement and the second rotational movement is provided to a transmission arrangement; and
   wherein the electrical motor arrangement is configured to operate in the first configuration and the second configuration by selectively braking one of the first rotation element and the second rotation element;
controlling the electrical motor arrangement wherein in the first configuration, a first force receiving element of the transmission arrangement is driven and a second force receiving element of the transmission arrangement is braked and whereby in the second configuration, the second force receiving element is driven and the first force receiving element is braked; and
providing at least one of the first rotational movement and the second rotational movement to the transmission arrangement; and
wherein the method is configured for providing rotational movement for a transmission of a vehicle.

16. The method of claim 15, wherein the first rotation element is connected to a sun wheel of a planetary gearbox and the second rotation element is connected to planets of the planetary gearbox; and wherein the controlling of the electrical motor arrangement is further comprising: controlling the electrical motor arrangement in a third configuration,
   wherein in the third configuration, the first rotation element is configured as a first rotor of the electrical motor arrangement and the second rotation element is configured as a second rotor of the electrical motor arrangement; and
   wherein in the third configuration, the planets and the sun wheel are driven.

17. A vehicle comprising an electrical motor arrangement, wherein the electrical motor arrangement comprising:
   a first rotation element configured for providing a first rotational movement of the electrical motor arrangement; a second rotation element configured for providing a second rotational movement of the electrical motor arrangement; a first brake unit configured to brake the first rotation element; and a second brake unit configured to brake the second rotation element; and
   wherein in a first configuration, the first rotation element is configured as a stator of the electrical motor arrangement and the second rotation element is configured as a rotor of the electrical motor arrangement; and
   wherein in a second configuration, the first rotation element is configured as the rotor of the electrical motor arrangement and the second rotation element is configured as the stator of the electrical motor arrangement;
   whereby at least one of the first rotational movement and the second rotational movement is provided to a transmission arrangement; and
   wherein the electrical motor arrangement is configured to operate in the first configuration and the second configuration by selectively braking one of the first rotation element and the second rotation element; and
   wherein the electrical motor arrangement is configured for providing a rotational movement for a transmission of the vehicle.

18. The vehicle of claim 17, wherein the electrical motor arrangement is housed in a housing.

19. The vehicle of claim 17, wherein the electrical motor arrangement is configured as at least one of a three-phase motor, a linear motor, an alternating current motor, a transverse flux machine, a direct current motor, a universal motor, a repulsion motor, a ball bearing motor, a unipolar machine, a disc motor, and anaxial flux motor.

20. The vehicle of claim 17, wherein a planetary gearbox is configured to be used in the electrical motor arrangement in the vehicle; and wherein the first rotation element is connected to a sun wheel of the planetary gearbox and the second rotation element is connected to planets of the planetary gearbox.

\* \* \* \* \*